United States Patent
Kertesz

(10) Patent No.: US 6,230,749 B1
(45) Date of Patent: May 15, 2001

(54) MULTILAYER TUBE

(75) Inventor: Janos Kertesz, Hofheim (DE)

(73) Assignee: Norma Products (US) Inc., Wixom, MI (US)

( * ) Notice: Subject to any disclaimer, the term of this patent is extended or adjusted under 35 U.S.C. 154(b) by 0 days.

(21) Appl. No.: 09/450,913

(22) Filed: Nov. 29, 1999

(51) Int. Cl.[7] .................................................. F16L 11/04
(52) U.S. Cl. ......................... 138/137; 138/141; 138/146
(58) Field of Search .................................. 138/137, 141, 138/146

(56) References Cited

U.S. PATENT DOCUMENTS

| | | | |
|---|---|---|---|
| 4,196,464 | * 4/1980 | Russell | 138/137 |
| 4,407,888 | * 10/1983 | Crofts | 138/137 |
| 4,508,870 | * 4/1985 | Dufour et al. | 525/64 |
| 5,038,833 | 8/1991 | Brunnhofer | 138/137 |
| 5,076,329 | 12/1991 | Brunnhofer | 138/137 |
| 5,219,003 | 6/1993 | Kerschbaumer | 138/137 |
| 5,390,705 | * 2/1995 | Brunnhofer | 138/137 |
| 5,397,600 | * 3/1995 | Shibata et al. | 427/358 |
| 5,469,892 | 11/1995 | Noone et al. | 138/121 |
| 5,524,673 | * 6/1996 | Noone et al. | 138/140 |
| 5,678,611 | 10/1997 | Noone et al. | 138/137 |
| 5,996,642 | * 12/1999 | Noone et al. | 138/137 |

FOREIGN PATENT DOCUMENTS 2204376A    11/1988    (GB) .

OTHER PUBLICATIONS

SAE–XJ2260, *Non–Metallic Fuel System Tubing With One Or More Layers*, Draft for Ballot, May 1, 1996.
*Test Specification General Motors*, Engineering Standards Europe, GME 08 100; Jan. 1991.

* cited by examiner

*Primary Examiner*—James Hook
(74) *Attorney, Agent, or Firm*—Darby & Darby

(57) ABSTRACT

The present invention provides a multilayer tube comprising (a) a first outer thermoplastic layer and (b) a second inner thermoplastic diffusion barrier layer which is directly bonded or fused to the first layer by a material-to-material bond. The second layer has a thickness of from about 0.1 to about 0.6 mm. At least one layer of the multilayer tube has an elongation value at break of at least about 130%. Also, at least one layer of the multilayer tube includes a heat stabilizer. The multilayer tube of the present invention is able to withstand 1,000 hours or more of contact with fuels without the layers delaminating. Furthermore, the multilayer tube is able to withstand 1,000 hours or more in an antifreeze mixture of 5 to 50 percent by volume of methanol in water at from about –20 to about 80° C. without the layers delaminating. The multilayer tube of the present invention does not require an intermediate bonding or primer layer to join the thermoplastic layers. Additionally, the multilayer tube does not delaminate after prolonged contact with fuel, oil, and antifreeze or heating and cooling. The multilayer tube may be used in motor vehicles as a fuel line or a vapor return or recovery line.

11 Claims, 1 Drawing Sheet

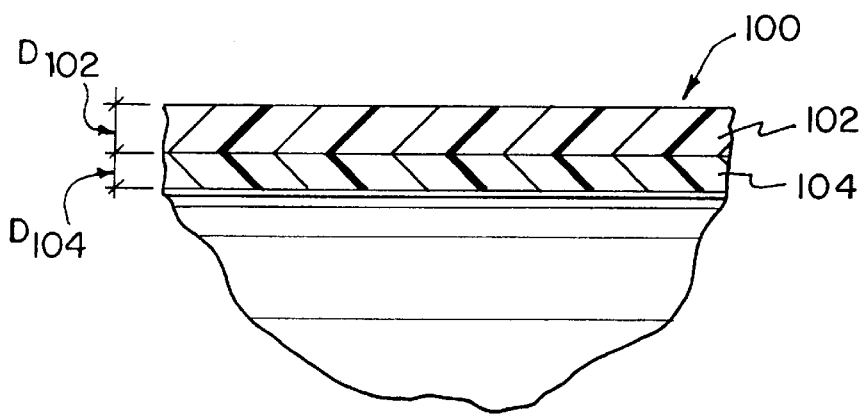
FIG. 1
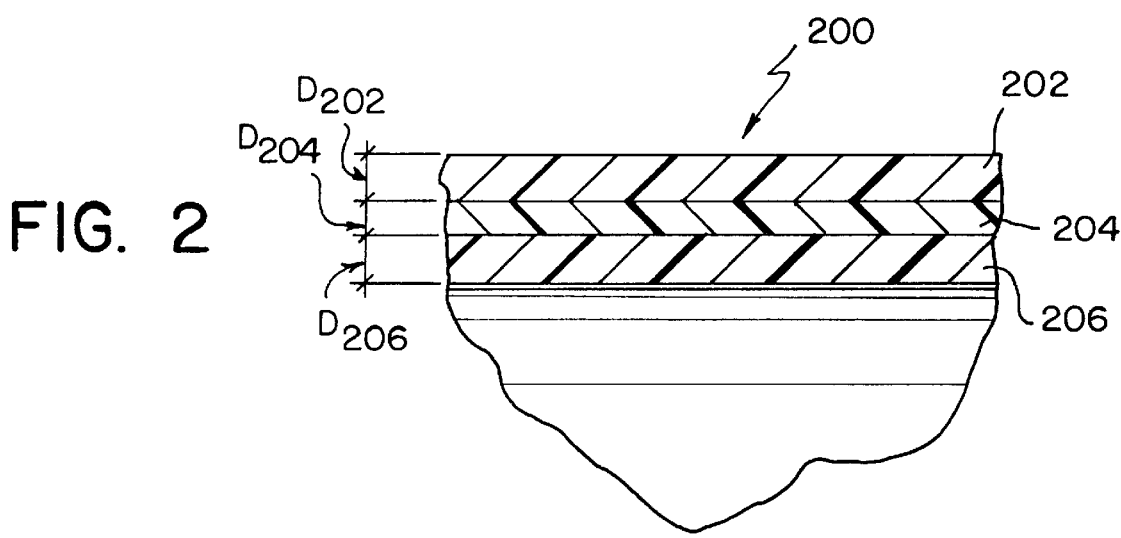
FIG. 2
FIG. 3
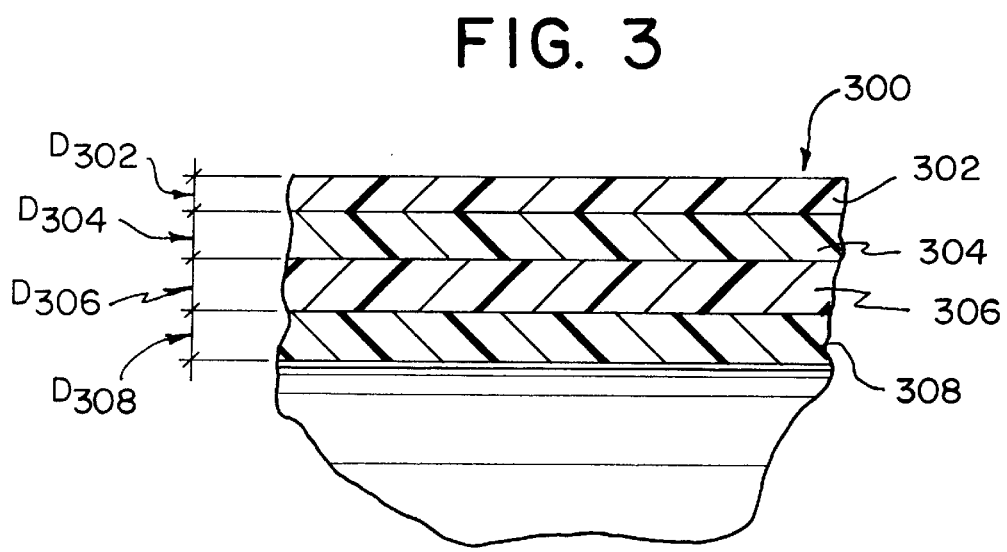

MULTILAYER TUBE

FIELD OF THE INVENTION

This invention relates to a multilayer tube for use in motor vehicles, which does not require an intermediate bonding or primer layer to join thermoplastic layers.

BACKGROUND OF THE INVENTION

U.S. Pat. No. 5,678,611 discloses a multilayer tube for use as a fuel line or vapor return or recovery line. The tube is composed of a thermoplastic outer tubing, a bonding layer, and an inner hydrocarbon barrier layer. When a multilayer tube with a bonding layer, such as that in U.S. Pat. No. 5,678,611, is used in a motor vehicle, the individual layers frequently delaminate (or separate from one another) after prolonged contact with fuel, oil, or antifreeze (which typically can be a mixture of water and alcohol); heating; or cooling.

There is a continuing need for multilayer tubes for use in motor vehicles which do not delaminate after prolonged contact with fuel, oil or antifreeze; heating; or cooling.

SUMMARY OF THE INVENTION

The present invention provides a multilayer tube comprising (a) a first outer thermoplastic layer and (b) a second inner thermoplastic diffusion barrier layer which is bonded or fused to the first layer by a material-to-material bond. The second layer has a thickness of from about 0.1 to about 0.6 mm. At least one layer of the multilayer tube has an elongation value at break of at least about 130%. Also, at least one layer of the multilayer tube includes a heat stabilizer. The multilayer tube of the present invention is able to withstand 1,000 hours or more of contact with fuels without the layers delaminating. Furthermore, the multilayer tube is able to withstand 1,000 hours or more in an antifreeze mixture of 5 to 50 percent by volume of methanol in water at from about −20 to about 80° C. without the layers delaminating.

The multilayer tube of the present invention does not require an intermediate bonding or primer layer to join the thermoplastic layers. Additionally, the multilayer tube does not delaminate after prolonged contact with fuel, oil, and antifreeze or heating and cooling. The multilayer tube may be used in motor vehicles as a fuel line or a vapor return or recovery line.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which:

FIG. 1 is a cross-sectional view of a two layer embodiment of the multilayer tube of the present invention;

FIG. 2 is a cross-sectional view of a three layer embodiment of the multilayer tube of the present invention; and FIG. 3 is a cross-sectional view of a four layer embodiment of the multilayer tube of the present invention.

DETAILED DESCRIPTION OF THE INVENTION

Referring to FIG. 1, a multilayer tube 100 of the present invention comprises a first outer layer 102 and a second inner layer 104 bonded to the first outer layer 102. The two layers are bonded or fused together by a material-to-material bond, i.e., there is no bonding or primer layer between the two layers. This type of bonding may be achieved by the inclusion of thermoplastic materials selected such that the material of the first layer is substantially or completely chemically similar to that of the second layer.

At least one layer, preferably the outer layer 102, has an elongation value at break of at least 130%. The layer with the greatest elongation value at break preferably has a thickness of at least about 1 mm.

Suitable thermoplastic materials include, but are not limited to, polyamides, polyolefins, polyesters, elastomers, polyketones, fluorothermoplastics, polyoxymethylenes, polyphenylene sulfides, and any combination of any of the foregoing. Suitable polyamides include, but are not limited to, polyamide 4.6, polyamide 6, polyamide 6.6, polyamide 11, polyamide 12, polyamide 6.12, aromatic copolyamides, polyether block amides, and any combination of any of the foregoing. Suitable polyolefins include, but are not limited to, high density polyethylene (HDPE), low density polyethylene (LDPE), linear low density polyethylene (LLDPE), and any combination of any of the foregoing. Suitable polyesters include, but are not limited to, polybutylene terephthalate (PBT), polyethylene terephthalate (PET), polyethylene naphthalate (PEN), polybutylene naphthalate (PBN), thermoplastic etheresterelastomers (TEEE), and any combination of any of the foregoing. Suitable elastomers include, but are not limited to, thermoplastic elastomers (TPE's). Suitable polyketones include, but are not limited to, aliphatic polyketones. Suitable fluorothermoplastics include, but are not limited to, polyvinylidene fluoride (PVDF), ethylenetetrafluorethylene polymer (ETFE), trifluoroethylene-hexafluoropropylene-vinylidene difluoride (THV), and any combination of any of the foregoing. Preferred thermoplastic materials include, but are not limited to, thermoplastic etheresterelastomers, polybutylene terephthalates, and any combination of any of the foregoing.

Combinations of thermoplastic materials which form material-to-material bonds with one another include, but are not limited to, polyamide 66 and polyamide 12; polyamide 66 and polyamide 11; and polyamide 66 and polyamide 6.

Preferred thermoplastic materials for the layer with an elongation value at break of at least 130% include, but are not limited to, polyester elastomers, polyamide elastomers, and any combination of any of the foregoing. The outer layer 102 typically has a thickness and elongation value at break greater than that for the inner layer 104.

One or more of the layers of the tube may include an adhesion promoter which forms bonds with or crosslinks to one or more adhesion promoters or thermoplastic materials in one or more of the adjacent layers. Any adhesion promoter known in the art may be included in the layers of the tube.

The thermoplastic materials in adjacent layers may be selected such that at least one thermoplastic material in each layer bonds or fuses with at least one thermoplastic material in the adjacent layer. For example, since some thermoplastic etheresterelastomers bond with polybutylene terephthalate, the outer layer of the tube may be comprised of thermoplastic etheresterelastomers while the inner layer is comprised of polybutylene terephthalate. Adhesion promoters may be included in one or more layers to increase the adhesion between the layers.

Alternatively, although not preferred, the thermoplastic materials in adjacent layers may be selected such that none of the thermoplastic materials in each layer bond or fuse with a thermoplastic material in an adjacent layer. In such an embodiment, adhesion promoters are included in each layer to join the layers together.

The inner layer 104 prevents materials which flow through the multilayer tube, such as hydrocarbons, water, and hydrogen, from diffusing out of the multilayer tube, i.e., the layer acts as a barrier. In order to decrease the permeability of the multilayer tube 100 to hydrocarbons and increase chemical resistance, the thermoplastic material of the inner layer 104 is preferably crosslinked.

The multilayer tube may also include additional inner layers. Preferably, the additional inner layers are concentric layers. Each additional inner layer is bonded to the next outer layer by a material-to-material bond. At least one of the additional inner layers is bonded to the inner layer 104 by a material-to-material bond. The total thickness of the inner layer 104 and any additional inner layers preferably ranges from about 0.1 to about 0.6 mm. The additional layers may also prevent diffusion of hydrocarbons therethrough and/or be crosslinked.

At least one of the layers includes a heat stabilizer to ensure long-term resistance to heat. Any heat stabilizer known in the art may be included in one or more of the layers of the multilayer tube.

One or more of the layers is preferably not electrostatically chargeable. The surface resistance of the layers 102 and/or 104 typically ranges from about 1 to about $10^9$ ohm/cm$^2$ and preferably from about $10^3$ to about $10^9$ ohM/cm$^2$.

A flame retardant additive may also be included in one or more layers of the multilayer tube. Preferably, a flame retardant additive is included in the layer which has an elongation value at break of at least about 130%. Glass filaments may be included in any of the layers to reinforce the layer. Other flame retardant additives and adjuvants may be included in one or more of the layers of the multilayer tube as known in the art.

The material-to-material bond between the layers of the multilayer tube is able to withstand long-term contact with various fuels. Typically, the multilayer tube of the present invention is able to withstand 1,000 or more hours and preferably 3,000 or more hours of contact with fuels without the layers delaminating. Also, the material-to-material bond is able to withstand long-term immersion in antifreeze. Typically, the multilayer tube is able to withstand 1,000 or more hours and preferably 2,000 or more hours in an antifreeze mixture of 5 to 50 percent by volume of methanol and water at from about −20 to about 80° C. without the layers delaminating.

The thickness ratio of the layers may be optimized by methods known in the art to meet, if not exceed, the low-temperature impact strength and elongation value at breaks required by various automotive industry standards, such as the draft standard SAE XJ2260 of May 1, 1996, Test Specification GME 08 100 of General Motors Europe of January 1991, and the Quality Specification QV16006 of Bayrische Motoren Werke AG of 1991.

Another embodiment of a multilayer tube 200 of the present invention is shown in FIG. 2. The multilayer tube 200 comprises an outer layer 202, a middle layer 204, and an inner layer 206. All three layers are composed of thermoplastic materials as described above and are joined together by material-to-material bonds. Preferably, the outer layer 202 has an elongation value at break of at least 130%.

In one preferred embodiment, the outer and inner layers are comprised of one or more thermoplastic etheresterelastomers. The middle layer is comprised of one or more polybutylene terephthalates.

The ratio of thicknesses of the three layers 202, 204, and 206 having thicknesses $D_{202}$, $D_{204}$, and $D_{206}$, respectively, is typically $D_{204} < D_{202} \leq D_{206}$. The ratio of elongation value at breaks of the three layers 202, 204, and 206 having elongation value at breaks $R_{202}$, $R_{204}$, and $R_{206}$, respectively, is typically $R_{204} < R_{202} \leq R_{206}$.

Yet another embodiment of the invention is shown in FIG. 3. The multilayer tube 300 has four layers 302, 304, 306, and 308 (from outermost layer to innermost layer). The first three layers 302, 304, and 306 may have thicknesses and elongation value at breaks as discussed above for the layers 202, 204, and 206 respectively. A fourth and innermost layer 308 is joined by a material-to-material bond to the layer 306. When the thickness of the fourth layer 308 ($D_{308}$) is greater than or equal to the thickness of the first layer 302 ($D_{302}$) the elongation value at break of the fourth layer 308 ($R_{308}$) is typically greater than or equal to the elongation value at break of the first layer 302 ($R_{302}$). When the thickness $D_{308}$ is less than or equal to $D_{302}$, generally the elongation value at break $R_{308}$ is less than or equal to $R_{302}$.

Alternatively, the thickness and elongation value at break ratios of the four layers 302, 304, 306, and 308 may be $D_{308} = D_{302} < D_{304} < D_{306}$ and $R_{308} = R_{302} < R_{304} < R_{306}$, respectively.

The multilayer tube of the present invention may be prepared by coextrusion as known in the art.

Many variations of the present invention will suggest themselves to those skilled in the art in light of the above detailed description. Such obvious variations are within the full intended scope of the appended claims.

What is claimed is:

1. A multilayer tube comprising:
   a first outer thermoplastic layer;
   a second inner thermoplastic diffusion barrier layer directly bonded to the first layer and having a thickness of from about 0.1 to about 0.6 mm; and
   a third layer bonded to the second layer,
   wherein the first and third layers comprise one or more thermoplastic etheresterelastomers, the second layer comprises one or more polybutylene terephthalates, at least one of the layers has an elongation value at break of at least about 130%, at least one of the layers comprises a heat stabilizer, the tube is able to withstand 1,000 hours or more of contact with fuels without the layers delaminating, and the tube is able to withstand 1,000 hours or more in an antifreeze mixture of 5 to 50 percent by volume of methanol in water at from about −20 to about 80° C. without the layers delaminating.

2. The multilayer tube of claim 1, wherein the outer layer has an elongation value at break of at least about 130%.

3. The multilayer tube of claim 1, wherein the total thickness of the second layer and the third layer ranges from about 0.1 to about 0.6 mm.

4. The multilayer tube of claim 1, wherein at least one layer comprises an adhesion promoter.

5. The multilayer tube of claim 1, wherein at least one layer is not electrostatically chargeable.

6. The multilayer tube of claim 5, wherein the surface resistance of at least one layer is from about 1 to about $10^9$ ohm/cm$^2$.

7. The multilayer tube of claim 1, wherein the thermoplastic material of the layer having the elongation value at break of at least 130% is selected from the group consisting of polyester elastomers, polyamide elastomers, and any combination of any of the foregoing.

8. The multilayer tube of claim 1, wherein second inner thermoplastic diffusion barrier layer is a hydrocarbon barrier layer.

9. The multilayer tube of claim 1, wherein the thermoplastic material of at least one of the layers is crosslinked.

10. The multilayer tube of claim 9, wherein the thermoplastic material of the second layer is crosslinked.

11. The multilayer tube of claim 1, wherein the thermoplastic material of any of the layers further comprises a flame retardant additive.

* * * * *